(12) United States Patent
Zhou et al.

(10) Patent No.: US 12,526,584 B2
(45) Date of Patent: Jan. 13, 2026

(54) MEMS SPEAKER

(71) Applicant: AAC Kaitai Technologies (Wuhan) CO., LTD, Hubei (CN)

(72) Inventors: Yiwei Zhou, Wuhan (CN); Yu Shen, Wuhan (CN); Qiang Dan, Wuhan (CN); Yang Li, Wuhan (CN)

(73) Assignee: AAC Kaital Technologies (Wuhan) CO., LTD, Wuhan (CN)

( * ) Notice: Subject to any disclaimer, the term of this patent is extended or adjusted under 35 U.S.C. 154(b) by 158 days.

(21) Appl. No.: 18/525,894

(22) Filed: Dec. 1, 2023

(65) Prior Publication Data

US 2024/0397267 A1 Nov. 28, 2024

Related U.S. Application Data

(63) Continuation of application No. PCT/CN2023/096432, filed on May 26, 2023.

(51) Int. Cl.
*H04R 17/00* (2006.01)

(52) U.S. Cl.
CPC ....... *H04R 17/00* (2013.01); *H04R 2201/003* (2013.01)

(58) Field of Classification Search
CPC .. H04R 17/00; H04R 2201/003; H04R 19/04; H04R 19/005; H04R 7/18; H04R 1/04; H04R 7/06; H04R 31/003; H04R 31/006; H04R 7/04; H04R 17/02; H04R 2307/025; H04R 1/083; H04R 2410/03; H04R 7/16; H04R 1/023; H04R 1/025; H04R 1/2819; H04R 1/2873; H04R 17/005; H04R 19/02; H04R 2217/03; H04R 2307/023; H04R 2307/027; H04R 2440/05; H04R 2499/11; H04R 31/00; H04R 7/10; H04R 7/22; H04R 1/245; H04R 3/00; B81C 1/00158; B81C 1/00658; B81C 1/00301; B81C 2203/0109; B81B 2201/0257; B81B 2203/0127; B81B 3/0021; B81B 2203/0118; B81B 2201/033; B81B 2203/019; B81B 2203/0136;
(Continued)

(56) References Cited

U.S. PATENT DOCUMENTS

2012/0087522 A1* 4/2012 Lee .................. H04R 17/005
  216/17
2019/0362700 A1* 11/2019 Yamazoe ............. E04B 1/8404

FOREIGN PATENT DOCUMENTS

CN  110545511 B  *  5/2021  ............. H04R 17/02
CN  113490120 A  *  10/2021  ......... B81C 1/00158
(Continued)

*Primary Examiner* — Angelica M Mckinney
(74) *Attorney, Agent, or Firm* — Wiersch Law Group

(57) ABSTRACT

A Micro-Electro-Mechanical System (MEMS) speaker is provided including only a substrate enclosing a cavity, a piezoelectric diaphragm disposed above the substrate and covering the cavity, and a flexible structure layer covering the piezoelectric diaphragm. Both the piezoelectric diaphragm and the flexible structure layer are complete sheet structures, a young modulus of the flexible structure layer is less than a young modulus of the piezoelectric diaphragm, and the young modulus of the flexible structure layer is in a range of 100 MPa to 50 GPa. The MEMS speaker in the present disclosure does away with a harder structure layer and adopts a softer flexible structure layer, which better enhances the displacement and has a more prominent acoustic performance.

9 Claims, 3 Drawing Sheets

(58) Field of Classification Search
CPC ...... B81B 2203/0315; B81B 2203/058; B81B 3/0037; B81B 3/007; B81B 7/02; B81B 2201/0264; B81B 2207/098; B81B 3/0072; B81B 7/007; B81B 2201/025; H02N 1/008
See application file for complete search history.

(56) References Cited

FOREIGN PATENT DOCUMENTS

| | | | | | |
|---|---|---|---|---|---|
| CN | 215581695 U | * | 1/2022 | ............... | H04R 7/18 |
| WO | WO-2019144370 A1 | * | 8/2019 | ............. | H04R 17/00 |

* cited by examiner

MEMS SPEAKER

CROSS-REFERENCE TO RELATED APPLICATION

The present application is a continuation of PCT Patent Application No. PCT/CN2023/096432, filed May 26, 2023, which is incorporated by reference herein in its entirety.

TECHNICAL FIELD

The present disclosure relates to the field of electroacoustic transducer, and in particular relates to a MEMS speaker.

BACKGROUND

MEMS speakers have the advantages of good consistency, low power consumption, small size, low price and so on compared with conventional speakers, and have a broad market prospect.

Most of the existing MEMS speakers on the market are dedicated to full-band sound, for example, some MEMS products are assembly-type MEMS speakers, and their high-frequency band performance is poor, while their low-frequency band performance has no obvious advantage over conventional moving-coil speakers. There are also some MEMS products are pure silicon MEMS speakers, with better high-frequency band performance but poorer low-frequency band performance.

Meanwhile, most of the existing MEMS speakers use a driving mode of a piezoelectric layer plus a hard structure layer, and the energy conversion efficiency of this combination is low.

Therefore, it is necessary to provide a new MEMS speaker to solve the above technical problems.

SUMMARY

The present disclosure aims to provide a MEMS speaker with improved vibration displacement and more prominent acoustic performance.

In order to realize the above objective, the present disclosure provides a MEMS speaker, including only a substrate enclosing a cavity, a piezoelectric diaphragm disposed above the substrate and covering the cavity, and a flexible structure layer covering the piezoelectric diaphragm; where both the piezoelectric diaphragm and the flexible structure layer are complete sheet structures, a young modulus of the flexible structure layer is less than a young modulus of the piezoelectric diaphragm, and the young modulus of the flexible structure layer is in a range of 100 MPa to 50 GPa.

As an improvement, the young modulus of the piezoelectric diaphragm is in a range of 65 GPa to 75 GPa.

As an improvement, the flexible structure layer includes at least one organic film layer.

As an improvement, a surface of the flexible structure layer away from the piezoelectric diaphragm is recessed to form at least one recessed portion, and each of the at least one recessed portion does not penetrate the flexible structure layer.

As an improvement, one recessed portion is provided, and a projection of the recessed portion in a vibration direction of the MEMS speaker is at least partially located on the substrate.

As an improvement, one recessed portion is provided, and a projection of the recessed portion in a vibration direction of the MEMS speaker is located in the cavity of the substrate.

As an improvement, a plurality of recessed portions are provided, and the plurality of recessed portions are arranged in an array.

As an improvement, the piezoelectric diaphragm includes at least a first electrode layer disposed on the substrate, a piezoelectric film layer disposed on the first electrode layer, and a second electrode layer disposed on the piezoelectric film layer.

As an improvement, the cavity has a cross-section of a regular polygon or a circle.

As an improvement, the substrate includes a peripheral sidewall and a separating wall disposed within the cavity, and the separating wall separates the cavity into a plurality of sub-cavities.

Compared with the related technology, the present disclosure provides a MEMS speaker, the MEMS speaker includes only a substrate enclosing a cavity, a piezoelectric diaphragm disposed above the substrate and covering the cavity, and a flexible structure layer covering the piezoelectric diaphragm. Both the piezoelectric diaphragm and the flexible structure layer are complete sheet structures, a young modulus of the flexible structure layer is less than a young modulus of the piezoelectric diaphragm, and the young modulus of the flexible structure layer is in a range of 100 MPa to 50 GPa. The MEMS speaker in the present disclosure does away with a harder structure layer and adopts a softer flexible structure layer, which better enhances the displacement and has a more prominent acoustic performance. Meanwhile, an overall structure does not have a thin seam, which has a more prominent performance at the middle and high frequencies. The plurality of sub-cavities arranged in the array in order to form a plurality of drivers further enhances the maximum performance of the MEMS speaker. The MEMS speaker includes only the piezoelectric diaphragm and the flexible structure layer, so that the process is greatly simplified, the production is simple, and the yield of the product is improved.

DETAILED DESCRIPTION OF THE EMBODIMENTS

The technical solutions in the embodiments of the present disclosure are described clearly and completely in the following with reference to the accompanying drawings in the embodiments of the present disclosure. Apparently, the described embodiments are only some but not all of the embodiments of the present disclosure. Based on the embodiments in the present disclosure, all other embodiments obtained by a person of ordinary skill in the field without creative efforts fall within the protection scope of the present disclosure.

Figure 1:
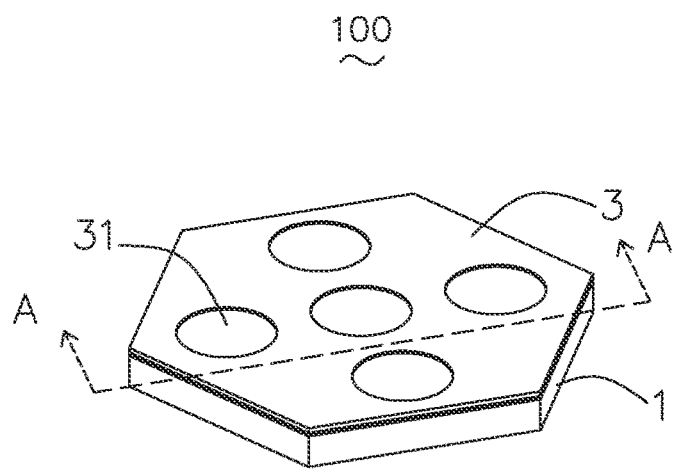
FIG. 1 shows a three-dimensional schematic structural diagram of a MEMS speaker according to a first embodiment of the present disclosure.
Figure 2:
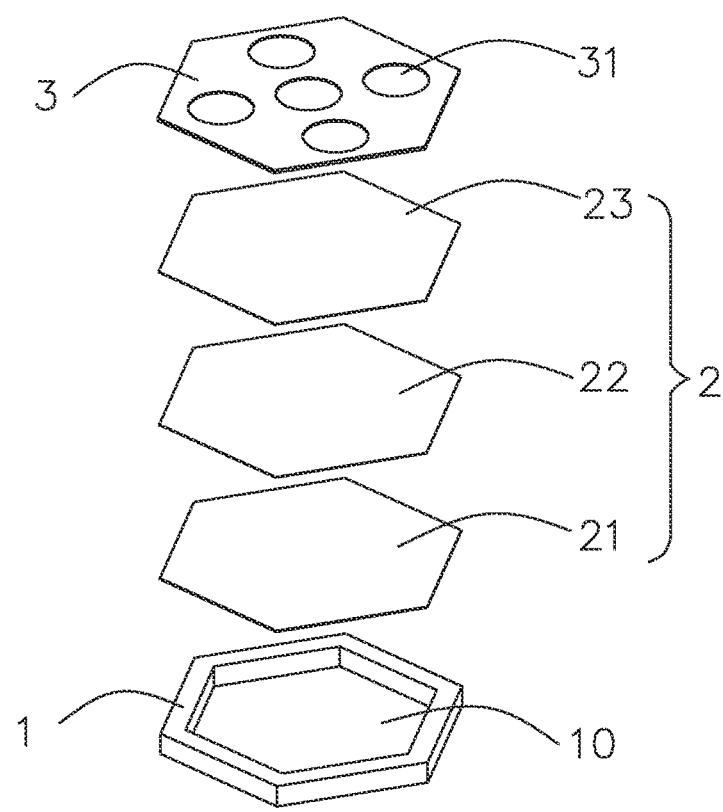
FIG. 2 shows an exploded view of the MEMS speaker shown in FIG. 1.
Figure 3:
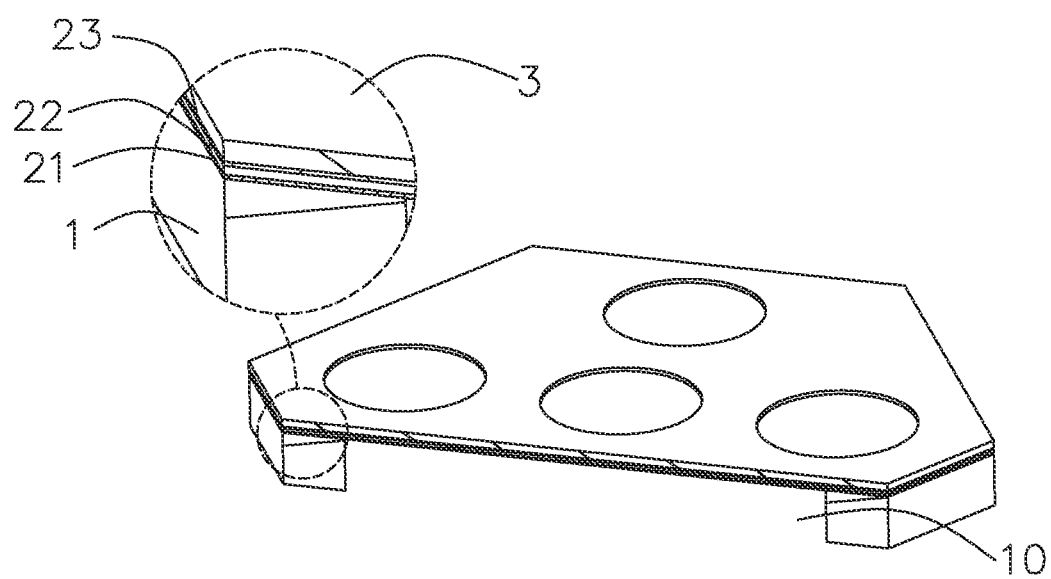
FIG. 3 shows a sectional view along line A-A in FIG. 1.

Referring also to FIG. 1 to FIG. 3, a first embodiment of the present disclosure provides a MEMS speaker 100. The MEMS speaker 100 includes only a substrate 1 enclosing a cavity 10, a piezoelectric diaphragm 2 disposed above the substrate 1 and covering the cavity 10, and a flexible structure layer 3 covering the piezoelectric diaphragm 2. The MEMS speaker 100 does away with a harder structure layer and adopts a softer flexible structure layer 3 for better displacement and more prominent acoustic performance.

The cavity 10 has a cross-section of a regular polygon or a circle. In the first embodiment, the cavity 10 has a regular hexagonal cross-section, and the substrate 1 has a regular hexagonal outer edge.

In the first embodiment, the piezoelectric diaphragm 2 is a complete sheet structure without a seam structure, and the piezoelectric diaphragm 2 includes at least a first electrode layer 21 disposed on the substrate 1, a piezoelectric film layer 22 disposed on the first electrode layer 21, and a second electrode layer 23 disposed on the piezoelectric film layer 22. In some embodiments, the piezoelectric diaphragm 2 further includes more piezoelectric film layers and electrode layers. The piezoelectric diaphragm 2 has a young modulus in a range of 65 GPa to 75 GPa.

The flexible structure layer 3 is a complete sheet structure without a seam structure, and the flexible structure layer 3 includes at least one organic film layer. A young modulus of the flexible structure layer 3 is less than the young modulus of the piezoelectric diaphragm 2, and the young modulus of the flexible structure layer 3 is in a range of 100 MPa to 50 GPa. An overall structure of the MEMS speaker 100 is free of seams, and the performance at middle and high frequencies is more prominent.

A surface of the flexible structure layer 3 away from the piezoelectric diaphragm 2 is recessed to form at least one recessed portion 31, and each of the at least one recessed portion 31 does not penetrate the flexible structure layer 3. The number of the recessed portions 31 may be one or more, and in the first embodiment, a plurality of the recessed portions 31 are provided and arranged in array. A projection of the recessed portion 31 in a vibrational direction of the MEMS speaker 100 is at least partially located on the substrate 1. In some embodiments, the projection of the recessed portion 31 in the vibration direction of the MEMS speaker 100 is located only within the cavity 10.

Figure 4:
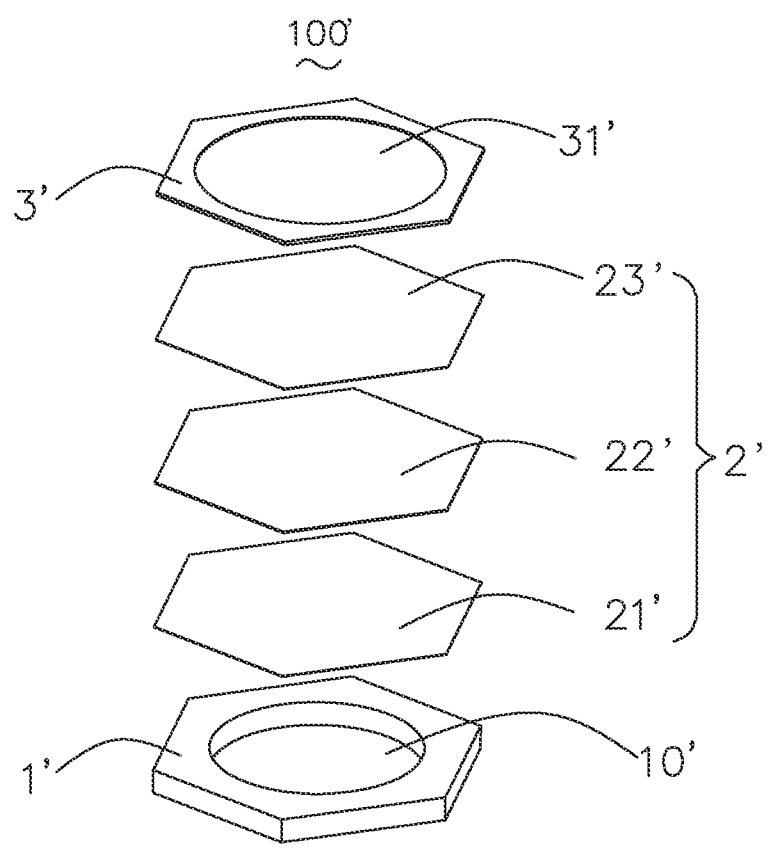
FIG. 4 shows a decomposition diagram of a MEMS speaker according to a second embodiment of the present disclosure.

Referring to FIG. 4, a second embodiment of the present disclosure provides a MEMS speaker 100'. The MEMS speaker 100' includes only a substrate 1' enclosing a cavity 10', a piezoelectric diaphragm 2' disposed above the substrate 1' and covering the cavity 10', and a flexible structure layer 3' covering the piezoelectric diaphragm 2'. In the second embodiment, the cavity 10' has a circular cross-section and the substrate 1' has a regular hexagonal outer edge.

In the second embodiment, the piezoelectric diaphragm 2' has the same structure as the piezoelectric diaphragm 2 in the first embodiment, and the piezoelectric diaphragm 2' includes at least a first electrode layer 21' disposed on the substrate 1', a piezoelectric film layer 22' disposed on the first electrode layer 21', and a second electrode layer 23' disposed on the piezoelectric film layer 22'.

The flexible structure layer 3' is a complete sheet structure without a seam structure, and the flexible structure layer 3' includes at least one organic film layer. A young modulus of the flexible structure layer 3' is less than a young modulus of the piezoelectric diaphragm 2', and the young modulus of the flexible structure layer 3' is in a range of 100 MPa to 50 GPa. An overall structure of the MEMS speaker 100' is free of seams, and the performance at middle and high frequencies is more prominent.

A surface of the flexible structure layer 3' away from the piezoelectric diaphragm 2' is recessed to form at least one recessed portion 31', and each of the at least one recessed portion 31' does not penetrate the flexible structure layer 3'. In the second embodiment, one recessed portion 31' is provided, and a projection of the recessed portion 31' in a vibration direction of the MEMS speaker 100' is at least partially located on the substrate 1'. In some embodiments, the projection of the recessed portion 31' in the vibration direction of the MEMS speaker 100' is located only within the cavity 10'.

Figure 5:
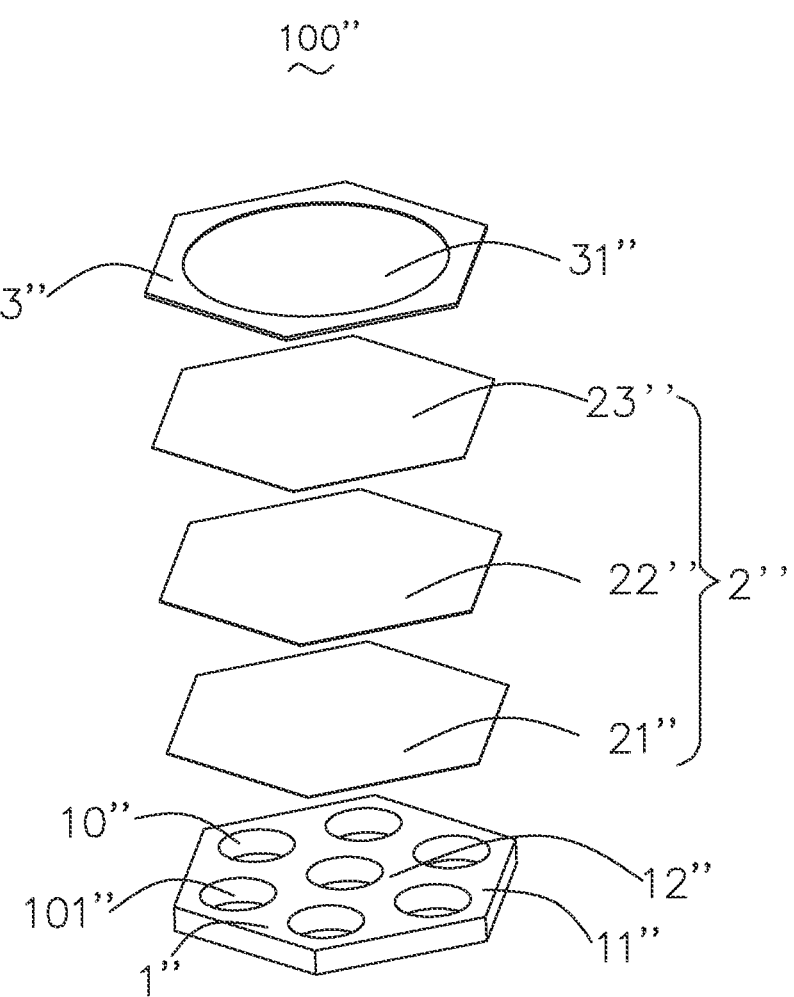
FIG. 5 shows a decomposition diagram of a MEMS speaker according to a third embodiment of the present disclosure.

Referring to FIG. 5, a third embodiment of the present disclosure provides a MEMS speaker 100". The MEMS speaker 100" includes only a substrate 1" enclosing a cavity 10", a piezoelectric diaphragm 2" disposed above the substrate 1" and covering the cavity 10", and a flexible structure layer 3" covering the piezoelectric diaphragm 2".

In the third embodiment, the substrate 1" includes a peripheral sidewall 11" and a separating wall 12" disposed within the cavity 10", and the separating wall 12" separates the cavity 10" into a plurality of sub-cavities 101". The plurality of the sub-cavities 101" may be of the same or different shapes, preferably the plurality of the sub-cavities 101" have the same shape and the plurality of the sub-cavities 101" are arranged in an array. The plurality of sub-cavities 101" arranged in the array form a plurality of drivers, thereby further enhancing the maximum performance of the MEMS speaker.

In the third embodiment, the piezoelectric diaphragm 2" has the same structure as the piezoelectric diaphragm 2 in the first embodiment, and the piezoelectric diaphragm 2" includes at least a first electrode layer 21" disposed on the substrate 1", a piezoelectric film layer 22" disposed on the first electrode layer 21", and a second electrode layer 23" disposed on the piezoelectric film layer 22".

The flexible structure layer 3" has the same structure as the flexible structure layer 3' in the second embodiment, and a surface of the flexible structure layer 3" away from the piezoelectric diaphragm 2" is recessed to form at least one recessed portion 31", and each of the at least one recessed portion 31" does not penetrate the flexible structure layer 3".

Compared with the related technology, the present disclosure provides a MEMS speaker, the MEMS speaker includes only a substrate enclosing a cavity, a piezoelectric diaphragm disposed above the substrate and covering the cavity, and a flexible structure layer covering the piezoelectric diaphragm. Both the piezoelectric diaphragm and the flexible structure layer are complete sheet structures, a young modulus of the flexible structure layer is less than a young modulus of the piezoelectric diaphragm, and the young modulus of the flexible structure layer is in a range of 100 MPa to 50 GPa. The MEMS speaker in the present disclosure does away with a harder structure layer and adopts a softer flexible structure layer, which better enhances the displacement and has a more prominent acoustic performance. Meanwhile, an overall structure does not have a thin seam, which has a more prominent performance at the middle and high frequencies. The plurality of sub-cavities arranged in the array in order to form a plurality of drivers further enhances the maximum performance of the MEMS speaker. The MEMS speaker includes only the piezoelectric diaphragm and the flexible structure layer, so that the process is greatly simplified, the production is simple, and the yield of the product is improved.

The above description is only the embodiments of the present disclosure, it should be noted that, for the person of ordinary skills in this field, improvements can also be obtained without departing from creation concepts of the present disclosure, which all belong to the protection scope of the present disclosure.

What is claimed is:

1. A Micro-Electro-Mechanical System (MEMS) speaker, comprising only a substrate enclosing a cavity, a piezoelectric diaphragm disposed above the substrate and covering the cavity, and a flexible structure layer covering the piezoelectric diaphragm; wherein both the piezoelectric diaphragm and the flexible structure layer are complete sheet structures, a young modulus of the flexible structure layer is less than a young modulus of the piezoelectric diaphragm, and the young modulus of the flexible structure layer is in a range of 100 MPa to 50 GPa;

wherein a surface of the flexible structure layer away from the piezoelectric diaphragm is recessed to form at least one recessed portion, and each of the at least one recessed portion does not penetrate the flexible structure layer.

2. The MEMS speaker according to claim 1, wherein the young modulus of the piezoelectric diaphragm is in a range of 65 GPa to 75 GPa.

3. The MEMS speaker according to claim 1, wherein the flexible structure layer includes at least one organic film layer.

4. The MEMS speaker according to claim 1, wherein one recessed portion is provided, and a projection of the recessed portion in a vibration direction of the MEMS speaker is at least partially located on the substrate.

5. The MEMS speaker according to claim 1, wherein one recessed portion is provided, and a projection of the recessed portion in a vibration direction of the MEMS speaker is located in the cavity of the substrate.

6. The MEMS speaker according to claim 1, wherein a plurality of recessed portions are provided, and the plurality of recessed portions are arranged in an array.

7. The MEMS speaker according to claim 1, wherein the piezoelectric diaphragm includes at least a first electrode layer disposed on the substrate, a piezoelectric film layer disposed on the first electrode layer, and a second electrode layer disposed on the piezoelectric film layer.

8. The MEMS speaker according to claim 1, wherein the cavity has a cross-section of a regular polygon or a circle.

9. The MEMS speaker according to claim 1, wherein the substrate includes a peripheral sidewall and a separating wall disposed within the cavity, and the separating wall separates the cavity into a plurality of sub-cavities.

* * * * *